United States Patent

Jackson

[11] 3,727,382
[45] Apr. 17, 1973

[54] DOWNFLOW COALESCING FOR EMULSION TREATER

[75] Inventor: Morden A. Jackson, Barcelona, Spain

[73] Assignee: Maloney-Crawford Tank Corporation, Tulsa, Okla.

[22] Filed: Mar. 10, 1971

[21] Appl. No.: 122,741

[52] U.S. Cl. ..........................55/160, 55/174, 55/208
[51] Int. Cl. ...............................................B01d 19/00
[58] Field of Search...................55/21, 42, 174, 175, 55/185, 186, 199, 200; 210/Dig. 5

[56] References Cited

UNITED STATES PATENTS

| | | | |
|---|---|---|---|
| 2,522,378 | 9/1950 | Kirkbride | 210/Dig. 5 |
| 3,394,530 | 7/1968 | O'Neill et al. | 55/174 X |
| 3,255,571 | 6/1966 | Walker et al. | 55/174 X |
| 2,457,959 | 1/1949 | Walker | 55/175 X |
| 3,009,536 | 11/1961 | Glasgow | 55/174 X |
| 3,553,940 | 1/1971 | Piner, Jr. | 55/174 |

Primary Examiner—Reuben Friedman
Assistant Examiner—R. W. Burks
Attorney—Head & Johnson

[57] ABSTRACT

Mixed or emulsified fluids, especially oil-water emulsions, are caused to pass across a substantially horizontal coalescing medium vertically from the top of the medium there across to the bottom for more efficient separation of the phases and self maintenance of the coalescing section.

2 Claims, 5 Drawing Figures

PATENTED APR 17 1973 3,727,382
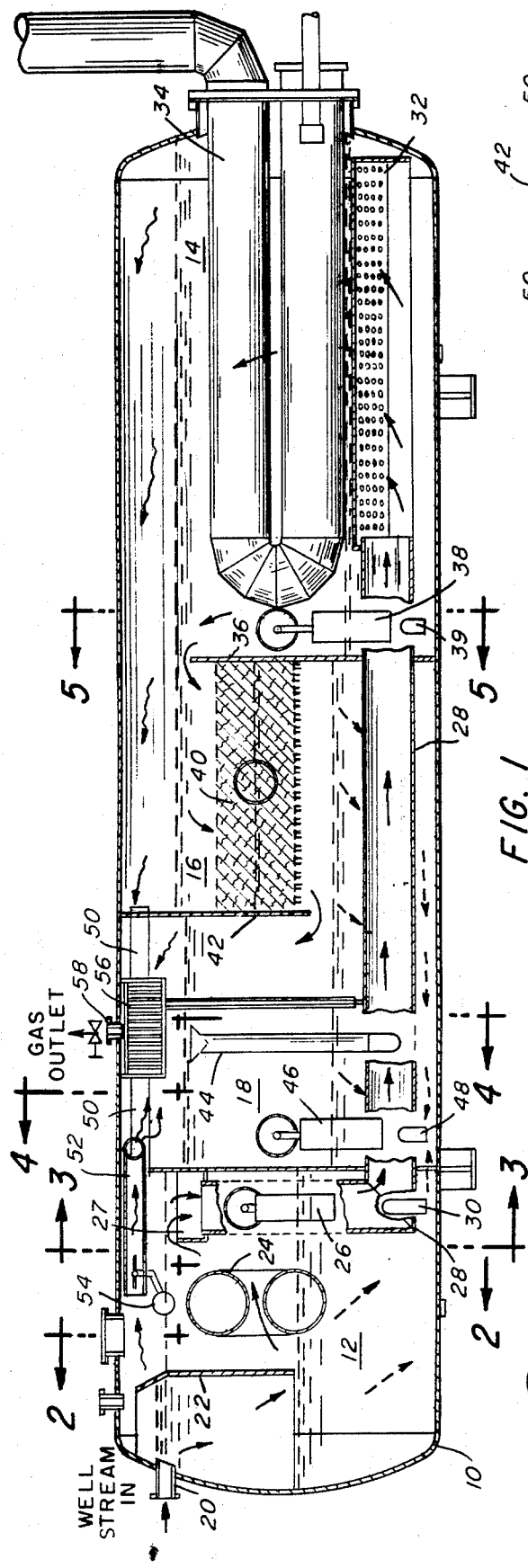
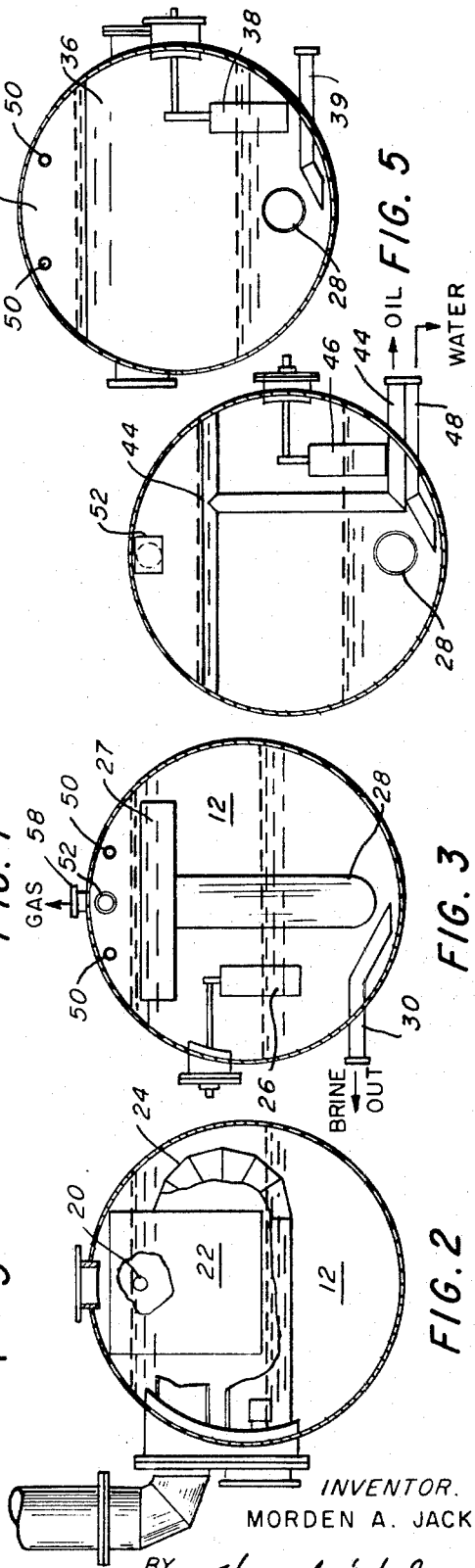
INVENTOR.
MORDEN A. JACKSON
BY Head & Johnson
ATTORNEYS

DOWNFLOW COALESCING FOR EMULSION TREATER

BACKGROUND

The treatment of oil well production to provide an effective separation of the components, particularly oil, gas and/or water, is an old and well-known art and is expressed in such art as may be found in U.S. Pat. Nos. 3,009,536; 3,394,530; and 3,553,940.

As in many heater-treater designs, a coalescing section is usually provided as an emulsion separation aid. Such sections typically contain permeable media such as excelsior, graded anthracite or the like, which is preferentially water wetted. The fluids to be separated are normally caused to pass in a direction upwardly through a horizontal coalescing bed section. It has been found that because of the normally horizontal configuration which is desirable for manufacture, maintenance, transportation and upkeep, some form of driving pressure force must be maintained to cause the emulsion to pass upwardly through the coalescing medium. In most instances it is desirable to use the normal pressure of the production fluid from the wells. Because of the nature of the coalescing medium there are certain frictional losses due to the fluid flow to be overcome and as time progresses, some plugging of the coalescing media may be effected. Because of this effect, higher driving forces must be established to overcome these losses. In many instances in order to clean the coalescing medium a back flow procedure must be incorporated, or the coalescing medium must be removed and replaced.

SUMMARY OF THE INVENTION

Accordingly it is an object of this invention to provide a substantially horizontal, large volume capacity, heating and treating vessel in which continuous flow separation of vapor and emulsified liquid phases is effected and in which the final separation of emulsified liquids is assisted by causing them to pass through a horizontally disposed coalescing medium in a downflow manner and additionally to provide a means of maintaining flow in the desired manner. Hence the invention will have the advantage of overcoming the objections to the known prior art devices by the fact that a final separation of, for example, oil and water emulsion is assisted by the effects of gravity. That is, the water which is to be removed will fall concurrently with the oil as opposed to its tendency to fall countercurrent to the direction of flow in the prior art devices. In addition there is hydrostatic head positioned atop the coalescing medium to effect a drive force which is capable of maintaining flow through the coalescing medium despite gradual deposition of elements tending to plug the medium. This is further accomplished by control over the gas pressure atop the hydrostatic head of liquid which tends to add additional driving force as needed to force the emulsion through the coalescing medium downwardly.

These and other objects of the invention will become apparent upon further reading of the description and claims when taken in conjunction with the drawings.

BRIEF DESCRIPTION OF THE DRAWINGS

FIG. 1 is a sectional view of the horizontal treater of this invention.

FIGS. 2, 3, 4 and 5 are sectional views taken along the corresponding lines of FIG. 1.

DESCRIPTION OF THE PREFERRED EMBODIMENT

Before explaining the present invention in detail, it is to be understood that the invention is not limited in its application to the details of construction and arrangement of parts illustrated in the accompanying parts, since the invention is capable of other embodiments and of being practiced or carried out in various ways. Also, it is to be understood that the phraseology or terminology employed herein is for the purpose of description and not of limitation. Referring now to the drawings, the treater apparatus of this invention comprises an essentially longitudinal or horizontal shell 10 which is basically divided into four treatment compartments 12, 14, 16 and 18. The description of the apparatus may also be understood in conjunction with its operation. A well stream comprising mixtures of oil, gas, water and emulsions thereof, enters the first compartment 12 via inlet 20 which is adapted to basically subdivide the various already substantially separated fluids utilizing baffle 22 and heater 24. This leaves brine at the bottom thereof, an emulsion of brine and oil intermediate and a gaseous area at the top. The interface level of emulsion and brine is controlled by float 26 with excess brine being removed via outlet 30 as controlled by the float 26. If desired heat may be added by means of heating tube 24 and the emulsion continues its travel over an overflow weir 27 to conduit 28 at the bottom of compartments 16 and 18 where it enters the second compartment 14 through a diversion or spreader type outlet 32 passing upwardly across heater 34 which further aids separation of the components. Evolved vapors escape into the upper portion of the compartment with the now further heated emulsion caused to pass over a metering means, such as baffle 36, into the third compartment 16. The interface level of emulsion and brine within compartment 14 is controlled by float 38 with excess brine being removed by outlet 39. Compartment 16 which represents an important concept of this invention comprises a horizontal bed of coalescing medium 40. The heated emulsion is caused to pass vertically downward effecting a separation of water from the oil. The water droplets fall to the bottom of chambers 16 and 18. The separated oil passes beneath metering weir or baffle 42 into the fourth compartment where it is drawn through outlet 44 to storage. The interface level of water and oil within the chambers 16 and 18 is maintained by control float 46 with water being removed via outlet 48.

In each of compartments 12, 14, 16 and 18, vapors rise to the upper portion of the compartments. In compartment 12 initial separation of vapor from the fluids entering at inlet 20 takes place. Vapors evolved in compartments 14 and 16 are removed by conduits 50 to compartment 12 where they combine with those arising from initial separation.

The combined vapors in compartment 12 are then removed to compartment 18 through conduit 52. In compartment 18 these vapors are further combined with any additional vapors arising in this compartment, are scrubbed of mist by a demister such as is shown by item 56, and all vapors finally exit from the vessel through outlet 58.

In order that additional driving force may be provided to force liquids from one compartment to another in a proper manner, particularly through the elements of the coalescing media, a float operated valve such as is shown by item 54 may be installed at the inlet of conduit 52 in compartment 12.

The need for additional driving force will be indicated by a rising level of liquid-vapor interface in compartment 12. This increasing level will then be sensed by the float operator of valve 54 which will tend to limit escape of vapors from compartment 12, and will increase the pressure of the vapor spaces of compartments 12, 14 and 16, above that existing in the vapor space of compartment 18. This difference in pressure is then transmitted to the liquid body to force flow in the desired direction.

What is claimed:

1. A horizontal treater to effect separation of plural mixed and/or emulsified fluids such as oil, gas and water comprising:
   a vessel divided into:
      a first compartment at one end of said vessel to receive the inlet of said fluids and to effect controlled removal of substantial portions of unmixed gas and water,
      a second compartment at the other end of said vessel having a heater therein to create partial water contaminated oil, and
      third and fourth compartments between said first and second compartments to receive overflow of said partial water contaminated oil,
   a substantially horizontal single bed coalescing section in said third compartment positioned so as to be submerged in oil above the normal water level therein;
   a flow conduit for said mixed or emulsified fluids from said first to said second compartment across said third and fourth compartments;
   means to meter said partial water contaminated oil from said second compartment into said third for substantially vertical downward flow across said coalescing section from top to bottom;
   means to meter fluids from below said coalescing section into said fourth compartment; and
   means to remove separated fluids from said compartments as needed.

2. Apparatus of claim 1 including
   means to continuously relieve gas pressure in said fourth compartment; and
   means to control gas pressure within said first, second and third compartments to provide additional driving force to said fluids flowing through said coalescing section.

* * * * *